United States Patent
Park et al.

(10) Patent No.: US 12,261,325 B2
(45) Date of Patent: Mar. 25, 2025

(54) BATTERY MODULE HAVING STRUCTURE CAPABLE OF PREVENTING BATTERY CELL DAMAGE, AND BATTERY PACK AND VEHICLE COMPRISING BATTERY MODULE

(71) Applicant: LG CHEM, LTD., Seoul (KR)

(72) Inventors: Won-Kyoung Park, Daejeon (KR); Jun-Yeob Seong, Daejeon (KR); Jung-Min Kwak, Daejeon (KR); Jun-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 373 days.

(21) Appl. No.: 16/964,540

(22) PCT Filed: Oct. 24, 2019

(86) PCT No.: PCT/KR2019/014065
§ 371 (c)(1),
(2) Date: Jul. 23, 2020

(87) PCT Pub. No.: WO2020/085815
PCT Pub. Date: Apr. 30, 2020

(65) Prior Publication Data
US 2021/0036295 A1    Feb. 4, 2021

(30) Foreign Application Priority Data
Oct. 26, 2018  (KR) .......................... 10-2018-0129071

(51) Int. Cl.
*H01M 50/502*   (2021.01)
*H01M 50/178*   (2021.01)
(Continued)

(52) U.S. Cl.
CPC ....... *H01M 50/502* (2021.01); *H01M 50/178* (2021.01); *H01M 50/211* (2021.01);
(Continued)

(58) Field of Classification Search
CPC .......... H01M 50/172–178; H01M 50/543–557
See application file for complete search history.

(56) References Cited

U.S. PATENT DOCUMENTS

2013/0052494 A1*  2/2013  Pei ...................... H01M 50/536
                                                      429/179
2016/0233476 A1*  8/2016  Okamoto ............. H01M 50/211
(Continued)

FOREIGN PATENT DOCUMENTS

EP    3 032 613 A1   6/2016
EP    3 624 227 A1   3/2020
(Continued)

OTHER PUBLICATIONS

Hoon et al., KR-20180074592-A (Espacenet machine translation). (Year: 2018).*
(Continued)

*Primary Examiner* — Haroon S. Sheikh
*Assistant Examiner* — Katharine A Caughron
(74) *Attorney, Agent, or Firm* — Birch, Stewart, Kolasch & Birch, LLP

(57) ABSTRACT

A battery module including a cell stack structure in which a plurality of battery cells including a first battery cell and a second battery cell neighboring each other are stacked. A bus bar frame assembly includes a plurality of lead drawing holes from which electrode leads included in the plurality of battery cells are drawn out. An electrode lead of a first polarity included in the first battery cell and an electrode lead of the first polarity included in the second battery cell are externally drawn out through a same lead drawing hole.

(Continued)

The electrode lead of the first battery cell and the electrode lead of the second battery cell are bent in a same direction at a same location and each includes a first bent portion formed on a terrace portion and a second bent portion formed in a region where a lead film is formed.

13 Claims, 10 Drawing Sheets

(51) Int. Cl.
  *H01M 50/211* (2021.01)
  *H01M 50/50* (2021.01)
  *H01M 50/553* (2021.01)

(52) U.S. Cl.
  CPC ......... *H01M 50/50* (2021.01); *H01M 50/553* (2021.01); *H01M 2220/20* (2013.01)

(56) References Cited

U.S. PATENT DOCUMENTS

| | | | |
|---|---|---|---|
| 2017/0092991 A1* | 3/2017 | Yun | ..................... H01M 50/557 |
| 2018/0006281 A1 | 1/2018 | Eom et al. | |
| 2018/0159096 A1 | 6/2018 | Kim et al. | |
| 2018/0183020 A1 | 6/2018 | Ju et al. | |
| 2018/0194235 A1 | 7/2018 | Kim et al. | |
| 2018/0269435 A1 | 9/2018 | Lee et al. | |
| 2019/0189979 A1 | 6/2019 | Choi et al. | |

FOREIGN PATENT DOCUMENTS

| | | | |
|---|---|---|---|
| JP | 2003-272572 A | | 9/2003 |
| JP | 2013-182677 A | | 9/2013 |
| JP | 2018-526802 A | | 9/2018 |
| KR | 10-2012-0040447 A | | 4/2012 |
| KR | 20120075377 A | * | 7/2012 |
| KR | 2014038037 A | * | 3/2014 |
| KR | 10-2014-0093424 A | | 7/2014 |
| KR | 10-2015-0114277 A | | 10/2015 |
| KR | 10-2017-0050510 A | | 5/2017 |
| KR | 10-2017-0054878 A | | 5/2017 |
| KR | 10-2017-0081967 A | | 7/2017 |
| KR | 10-2017-0094759 A | | 8/2017 |
| KR | 10-2017-0103232 A | | 9/2017 |
| KR | 10-2018-0074592 A | | 7/2018 |
| KR | 10-2018-0107900 A | | 10/2018 |

OTHER PUBLICATIONS

Choi et al., KR=20170094759-A (Espacenet machine translation). (Year: 2017).*
Kim et al., KR-20150114277-A (Espacenet machine translation). (Year: 2015).*
Espacenet machine translation of KR20140038037A (Year: 2014).*
Machine translation of KR20120075377A (Year: 2012).*
International Search Report for PCT/KR2019/014065 (PCT/ISA/210) mailed on Feb. 21, 2020.
Extended Search Report dated May 3, 2021 in corresponding EP Patent Application No. 19876373.2.

* cited by examiner

PRIOR ART

PRIOR ART

BATTERY MODULE HAVING STRUCTURE CAPABLE OF PREVENTING BATTERY CELL DAMAGE, AND BATTERY PACK AND VEHICLE COMPRISING BATTERY MODULE

TECHNICAL FIELD

The present disclosure relates to a battery module having a structure capable of preventing battery cell damage, and a battery pack including the same, and more particularly, to a battery module having a structure capable of preventing damage to a battery cell caused by interference between a pair of neighboring battery cells commonly combined to one bus bar among a plurality of bus bars included in a bus bar frame assembly, and a battery pack including the battery module. The present disclosure also relates to a vehicle including such a battery pack.

The present application claims priority to Korean Patent Application No. 10-2018-0129071 filed on Oct. 26, 2018 in the Republic of Korea, the disclosures of which are incorporated herein by reference.

BACKGROUND ART

Secondary batteries are widely used not only for small apparatuses, such as portable electronic devices, but also for medium and large apparatuses, such as vehicles and power storage apparatuses. When the secondary batteries are used for the medium and large apparatuses, a battery module, in which a large number of battery cells of the secondary batteries are electrically connected, is used to increase the capacity and output. In particular, pouch type battery cells including a pouch case are widely used for such medium and large apparatuses because of easy stacking.

In order for the battery cells to be electrically connected inside the battery module, electrode leads of the battery cells may be connected to each other and connected portions may be welded to maintain such connected states. Furthermore, the battery module may have parallel and/or serial electric connection between the battery cells, and in this regard, one end portions of the electrode leads may contact and be fixed to a bus bar for electric connection between the battery cells, via welding or the like.

FIG. 1 is a view for describing a conventional battery module structure. FIG. 2 is an enlarged view of a portion A shown in FIG. 1.

Referring to FIG. 1, a conventional battery module is shown, in which a cell stack structure 2 is formed by stacking a plurality of bidirectional drawn-out battery cells 1 and a bus bar frame assembly 3 is combined to each of both sides of the cell stack structure.

In such a conventional battery module, electrode leads 1a respectively included in a pair of adjacent battery cells 1 may be drawn out through one lead hole 3a formed in the bus bar frame assembly 3 to be combined to a same bus bar 3b.

In this case, as shown in FIG. 2, the electrode lead 1a provided in the battery cell 1 located at the left among the pair of adjacent battery cells 1 faces a boundary portion 1d between a lead film 1b and a pouch case 1c provided in the battery cell 1 located at the right.

Thus, according to relative movement of the pair of battery cells 1, the electrode lead 1a provided in the battery cell 1 located at the left may contact the boundary portion 1d between the lead film 1b and the pouch case 1c provided in the battery cell 1 located at the right.

In most cases, a positive electrode lead is formed of an aluminum (Al) material and a negative electrode lead is formed of a copper (Cu) material. When such a contact phenomenon occurs in the negative electrode lead, an aluminum layer exposed at an end portion of the pouch case 1c contacts the negative electrode lead 1a of the neighboring battery cell 1, and in this case, the aluminum layer exposed at the end portion of the pouch case 1c is oxidized, thereby causing an anode connection phenomenon in which sealing and insulating performances are weakened.

In order to prevent the occurrence of the anode connection phenomenon, an insulating tape may be attached to each of the negative electrode lead 1a and the boundary portion 1d between the lead film 1b and the pouch case 1c, which face each other, but when the insulating tape is attached, a component (the insulating tape) for insulation is added and an insulating tape attaching process needs to be added in terms of processes, and thus there is a loss in terms of productivity.

Accordingly, there is an urgent need for a method for preventing anode connection described above without having to use an additional material.

DISCLOSURE

Technical Problem

The present disclosure is designed to solve the problems of the related art, and therefore the present disclosure is directed to providing a battery module having a structure capable of preventing damage to a battery cell caused by interference between a pair of neighboring battery cells commonly combined to one bus bar among a plurality of bus bars included in a bus bar frame assembly.

The present disclosure is also directed to providing a battery pack including such a battery module and a vehicle including such a battery pack.

However, the technical problems to be solved by the present disclosure are not limited thereto, and other unmentioned objects will become apparent to one of ordinary skill in the art from the description of the present disclosure below.

Technical Solution

In one aspect of the present disclosure, there is provided a battery module including: a cell stack structure in which a plurality of battery cells including a first battery cell and a second battery cell neighboring each other are stacked, each of the battery cells including an electrode lead, a lead film on the electrode lead and a terrace portion; and a bus bar frame assembly combined to at least one side of the cell stack structure and including a plurality of lead drawing holes from which electrode leads are drawn out, wherein a first electrode lead of a first polarity included in the first battery cell and a second electrode lead of the first polarity included in the second battery cell are externally drawn out through a same lead drawing hole, and wherein the first electrode lead and the second electrode lead are bent in a same direction and each electrode lead comprises a first bent portion formed on the terrace portion and a second bent portion formed in a region where the lead film is formed.

A first bending direction in the first bent portion and a second bending direction in the second bent portion may be opposite directions.

The first bending direction of the first battery cell may be a direction approaching the second battery cell and the second bending direction of the first battery cell may be a direction receding from the second battery cell.

The first bending direction of the second battery cell may be a direction receding from the first battery cell and the second bending direction of the second battery cell may be a direction approaching the first battery cell.

The second bent portion of the first battery cell may be formed at a location corresponding to the terrace portion of the second battery cell.

The second bent portion of the first battery cell may be located further below the first bent portion of the second battery cell.

The first bent portion of the second battery cell may be formed at a location corresponding to the region where the lead film of the first battery cell is formed.

Bending angles of the first bent portion and the second bent portion may be in a range of 30° to 50°.

Bending angles of the first bent portion and the second bent portion may be the same.

The first battery cell and the second battery cell may each further include an electrode lead of a second polarity. The first polarity may be a negative polarity and the second polarity may be a positive polarity. Alternatively, the first polarity may be a positive polarity and the second polarity may be a negative polarity.

In another aspect of the present disclosure, there is provided a battery pack including a plurality of the battery modules according to an embodiment of the present disclosure described above.

In another aspect of the present disclosure, there is provided a vehicle including the battery pack according to an embodiment of the present disclosure described above.

Advantageous Effects

According to an aspect of the present disclosure, just by forming a bent portion in an electrode lead, damage to a battery cell caused by interference between a pair of neighboring battery cells commonly combined to one bus bar among a plurality of bus bars included in a bus bar frame assembly can be prevented without having to apply an additional component such as an insulating tape.

According to an aspect of the present disclosure, an aluminum layer exposed at an end portion of a pouch case can be prevented from contacting an electrode lead, in particular, a negative electrode lead, of a neighboring battery cell. Accordingly, anode connection can be prevented and as a result, a problem in which sealing and insulating performances are weakened because the aluminum layer exposed at the end portion of the pouch case is oxidized can be solved.

According to an aspect of the present disclosure, since there is no application of an additional component, manufacturing of a battery module and battery pack is simplified and a defect rate is reduced. As a result, a yield rate can be increased, thereby reducing manufacturing costs of the battery module and battery pack.

According to another aspect of the present disclosure, a battery pack including such a battery module and a vehicle including such a battery pack are provided. The battery pack and the vehicle have the advantages of the battery module according to the present disclosure. Since a battery cell is prevented from being damaged in the battery module of the present disclosure, the battery pack and vehicle including such a battery module can be used for a long time without deterioration of performance of the battery cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a structure of a battery module according to an embodiment of the present disclosure will be described with reference to FIGS. 3 through 8.

Figure 1:
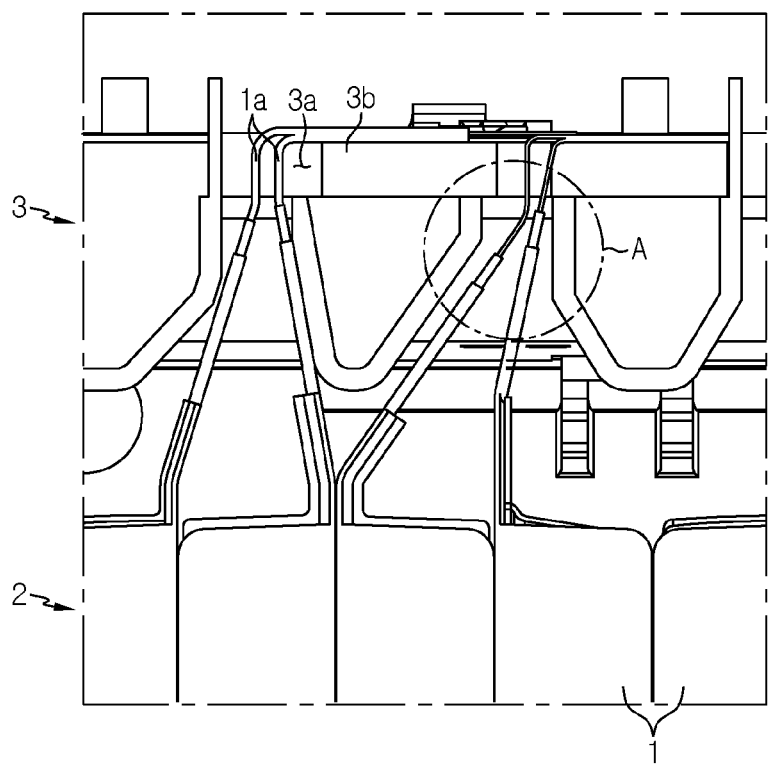
FIG. 1 is a view for describing a conventional battery module structure.
Figure 2:
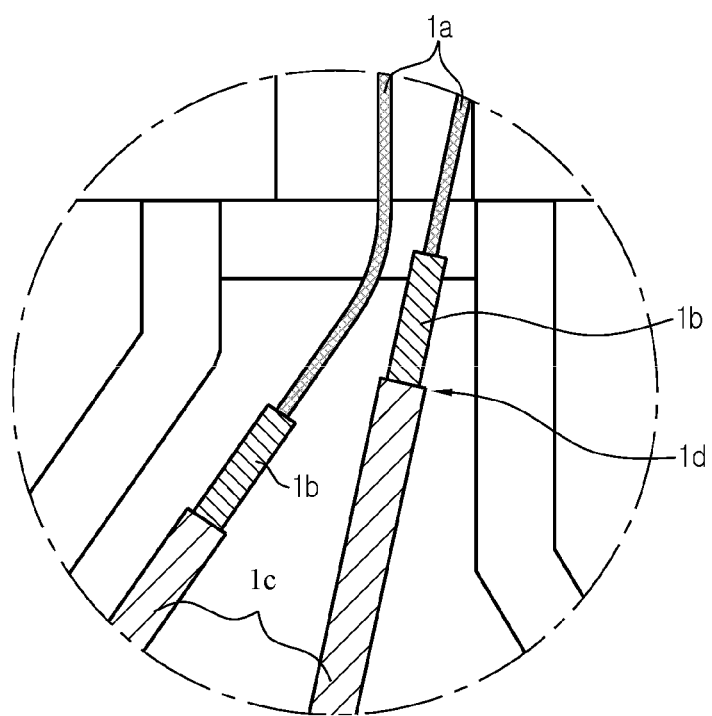
FIG. 2 is an enlarged view of a portion A shown in FIG. 1.
Figure 3:
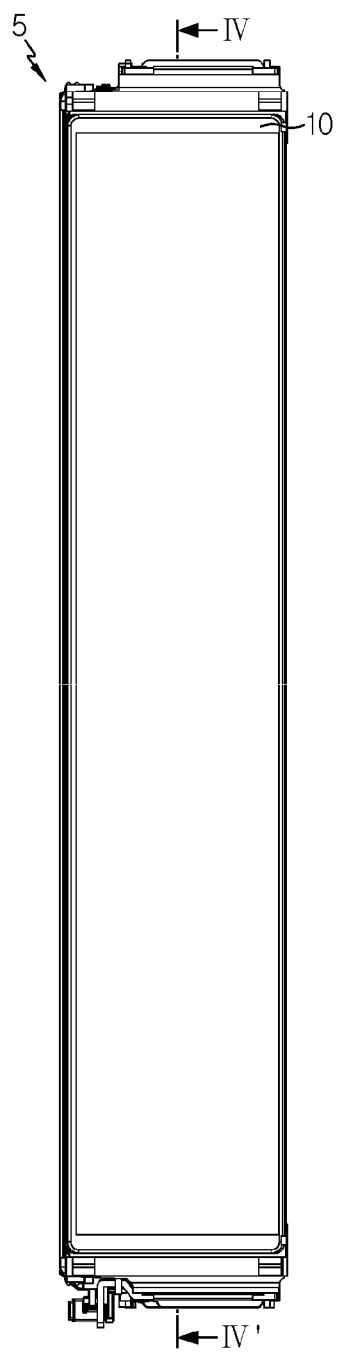
FIG. 3 is a front view of a battery module according to an embodiment of the present disclosure.
Figure 4:
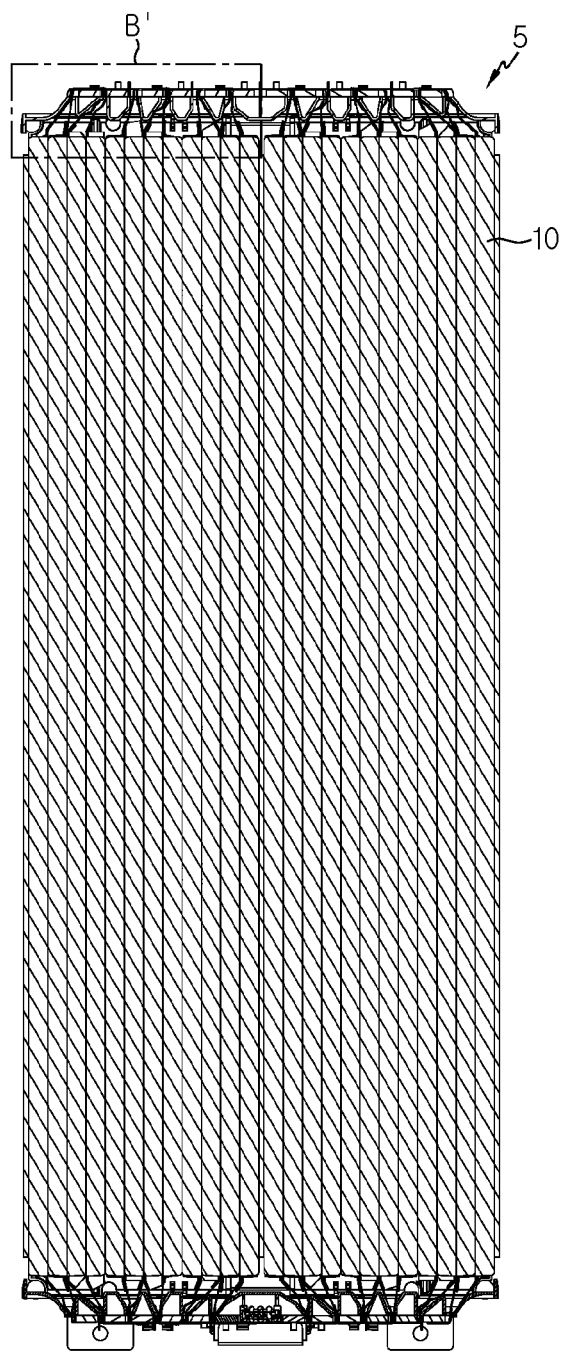
FIG. 4 is a cross-sectional view taken along a line IV-IV' of FIG. 3.
Figure 5:
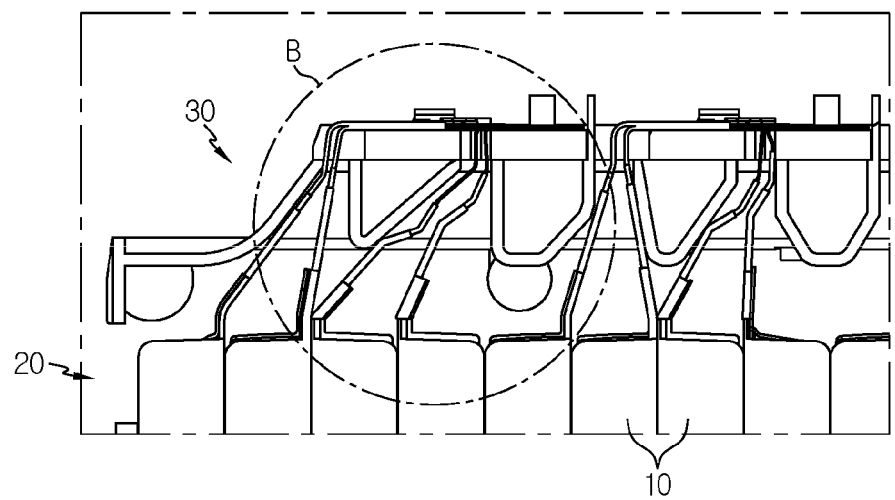
FIG. 5 is a cross-sectional view of an internal structure of a battery module according to an embodiment of the present disclosure and is an enlarged view of a portion B' of FIG. 3.
Figure 6:
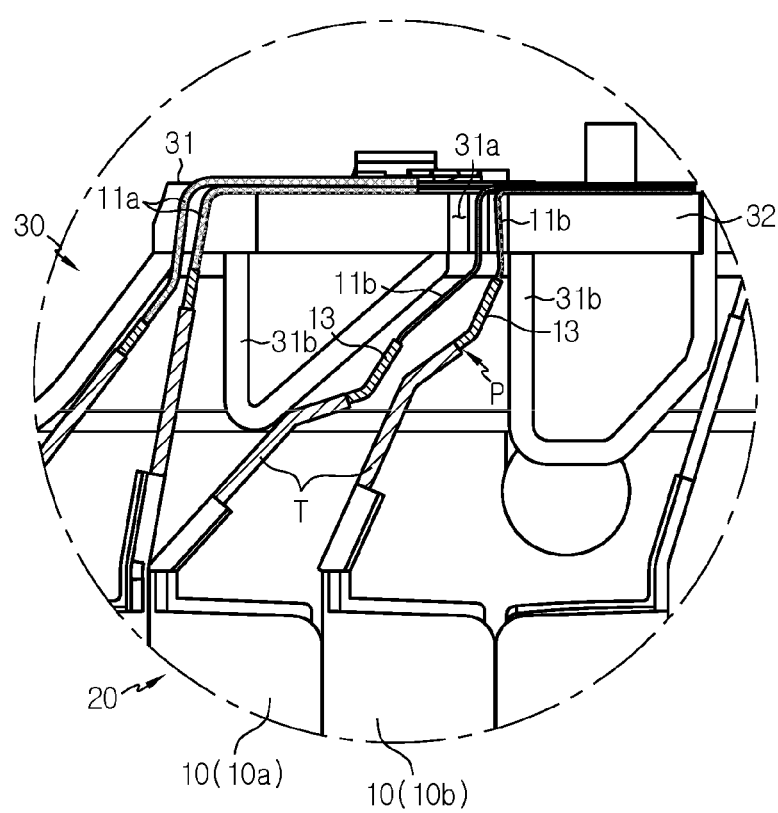
FIG. 6 is an enlarged view of a portion B of FIG. 5.
Figure 7:
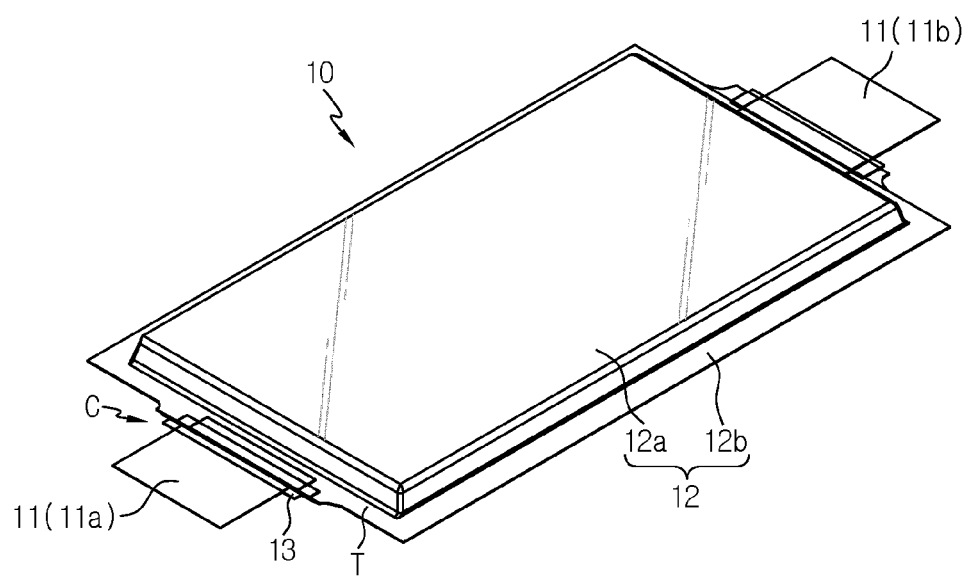
FIG. 7 is a perspective view of a battery cell applied to a battery module, according to an embodiment of the present disclosure.
Figure 8:
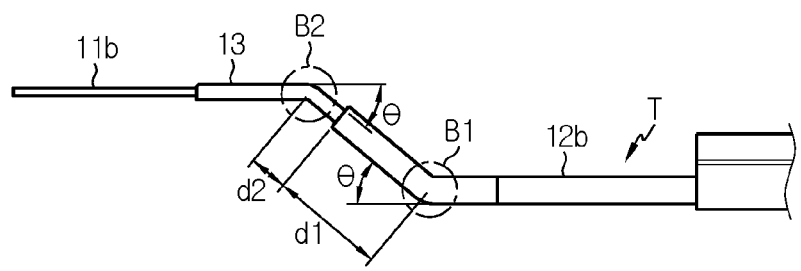
FIG. 8 is an enlarged view of a portion C of FIG. 7.

FIG. 3 is a front view of a battery module according to an embodiment of the present disclosure. FIG. 4 is a cross-sectional view taken along a line IV-IV' of FIG. 3. FIG. 5 is a cross-sectional view of an internal structure of a battery module according to an embodiment of the present disclosure and is an enlarged view of a portion B' of FIG. 3. FIG. 6 is an enlarged view of a portion B of FIG. 5. FIG. 7 is a perspective view of a battery cell applied to a battery module, according to an embodiment of the present disclosure, and FIG. 8 is an enlarged view of a portion C of FIG. 7.

First, referring to FIGS. 3 through 6, a battery module 5 according to an embodiment of the present disclosure includes a cell stack structure 20 in which a plurality of battery cells 10 are stacked, and a bus bar frame assembly 30 provided on at least one side of the cell stack structure 20.

For example, a pouch type battery cell may be applied as the battery cell 10. Also, such a pouch type battery cell may be a bidirectional drawn-out battery cell in which a pair of electrode leads 11 including an electrode lead of a first polarity and an electrode lead of a second polarity are drawn-out in opposite directions, and a plurality of the pouch type battery cells may be stacked while facing each other to form one cell stack structure. The first polarity may be a negative polarity and the second polarity may be a positive polarity. Alternatively, the first polarity may be a positive polarity and the second polarity may be a negative polarity.

The cell stack structure 20 may be arranged such that the electrode lead 11 included in each battery cell 10 extends along a direction perpendicular to the ground. In other words, each battery cell 10 may be erectly arranged such that a side surface is placed on the ground.

The battery cell 10 has a shape in which the electrode lead 11 is bent from a certain portion. Such a bent shape of the electrode lead 11 may prevent the electrode lead 11 included in one battery cell 10 from contacting a boundary portion P between a pouch case 12 and a lead film 13 of the battery cell 10 adjacent thereto, thereby preventing the electrode lead 11 and an aluminum layer of the pouch case 12 from contacting each other. A detailed structure of the battery cell 10 and the bent shape of the electrode lead 11 will be described in detail later with reference to FIGS. 7 and 8.

The bus bar frame assembly 30 is combined to at least one side of the cell stack structure 20, and includes a bus bar frame 31 and a plurality of bus bars 32 fixedly installed at the bus bar frame 31.

The bus bar frame 31 is arranged on at least one side of the cell stack structure 20 and includes a plurality of lead drawing holes 31a through which the electrode lead 11 of the battery cell 10 is drawn-out to the outside of the battery module 5. The plurality of battery cells 10 form a group of two, and the electrode leads 11 included in the pair of battery cells 10 in the same group are drawn-out to the outside through the same lead drawing hole 31a.

Also, the pair of electrode leads 11 drawn-out to the outside through the lead drawing hole 31a are attached to the same bus bar 32 via welding or the like. In this case, the pair of electrode leads 11 in the same group have the same polarity. For example, the pair of electrode leads 11 have the first polarity, i.e., the negative polarity.

The bus bar frame 31 may include a plurality of lead guides 31b formed under the lead drawing hole 31a to guide the electrode lead 11 to extend in a direction from a lower portion of the lead drawing hole 31a towards the lead drawing hole 31a.

Next, the detailed structure of the battery cell 10 and the bent shape of the electrode lead 11 applied to the present disclosure will be described in detail with reference to FIGS. 7 and 8 together with FIG. 6.

First, referring to FIG. 7, the battery cell 10 includes an electrode assembly (not shown), the pair of electrode leads 11, the pouch case 12, and the lead film 13.

The electrode assembly has a form in which a positive electrode, a separation film, and a negative electrode are sequentially stacked at least one or more times, or a form in which a stacked structure formed via stacking is wound.

The pair of electrode leads 11 extend in opposite directions by being connected respectively to a positive electrode tab and a negative electrode tab included in the electrode assembly. In this case, the electrode lead 11 connected to the positive electrode tab functions as a positive electrode lead 11a having the second polarity and the electrode lead 11 connected to the negative electrode tab functions as a negative electrode lead 11b having the first polarity. The electrode lead 11 is drawn-out to the outside of the pouch case 12 through a sealing portion 12b described later.

The pouch case 12 may be formed of a pouch film in which a resin layer, a metal layer, and a resin layer are sequentially stacked, and may include an accommodating portion 12a in which the electrode assembly is accommodated and the sealing portion 12b extending to the outside from the circumference of the accommodating portion 12a. The metal layer may be formed of an aluminum material. Before the sealing portion 12b is formed via thermal fusion or the like, an electrolyte, usually an electrolyte solution, is injected into the pouch case 12, together with the electrode assembly.

Meanwhile, among the sealing portion 12b formed on the circumference of the pouch case 12, the sealing portion 12b located in a direction where the electrode lead 11 is drawn out will hereinafter be referred to as a terrace portion T.

The lead film 13 surrounds a part of the electrode lead 11, and a portion of the lead film 13 is disposed between the electrode lead 11 and the sealing portion 12b of the pouch case 12 and the remaining portion of the lead film 13 is exposed to the outside of the sealing portion 12b of the pouch case 12. The lead film 13 is applied to prevent a sealing force of the sealing portion 12b from being weakened due to an insufficient adhesive force between the electrode lead 11 and the pouch case 12.

Referring to FIG. 8, the negative electrode lead 11b among the pair of electrode leads 11 included in the battery cell 10 is bent two times at different locations along a length direction. In particular, the negative electrode lead 11b includes a first bent portion B1 formed on the terrace portion T and a second bent portion B2 formed inside a region of the sealing portion 12b where the externally exposed lead film 13 is located.

The first bent portion B1 and the second bent portion B2 are bent in opposite directions, and bending angles θ are the same in the range of about 30° to about 50°. The bending angle θ may be defined as an angle at which the negative electrode lead 11b is bent with respect to a surface in which the negative electrode lead 11b extends in a direction where the negative electrode lead 11b is drawn-out. A distance d1 from the first bent portion B1 to an end portion of the sealing portion 12b, i.e., to the boundary portion P between the lead film 13 and the sealing portion 12b is about 2.5 mm to about 3.5 mm, and a distance d2 from the boundary portion P between the lead film 13 and the sealing portion 12b to the second bent portion B2 is about 0.5 mm to about 1.5 mm.

Referring back to FIG. 6, the pair of negative electrode leads 11b drawn-out through the same lead drawing hole 31a have the shape bent in the same direction at the same location. Hereinafter, for convenience of description, among the pair of battery cells 10 shown in FIG. 6, the battery cell 10 located relatively at the left will be referred to as a first battery cell 10a and the battery cell 10 located relatively at the right will be referred to as a second battery cell 10b.

A bending direction at the first bent portion B1 formed in the first battery cell 10a is a direction approaching the second battery cell 10b, and a bending direction at the second bent portion B2 of the first battery cell 10a is a direction receding from the second battery cell 10b. Also, a bending direction of the first bent portion B1 of the second battery cell 10b is a direction receding from the first battery cell 10a, and a bending direction at the second bent portion B2 of the second battery cell 10b is a direction approaching the first battery cell 10a.

Due to such bending directions and formed locations of the first and second bent portions B1 and B2, the second bent portion B2 of the first battery cell 10a is located at a location corresponding to the terrace portion T of the second battery cell 10b and is located further below the first bent portion B1 of the second battery cell 10b.

Also, the first bent portion B1 of the second battery cell 10b is formed at a location corresponding to a region of the first battery cell 10a where the lead film 13 exposed to the outside of the terrace portion T is formed.

Hereinafter, a cell damage preventing mechanism according to a bent structure of the negative electrode lead 11b described above will be described with reference to FIGS. 9 and 10.

Figure 9:
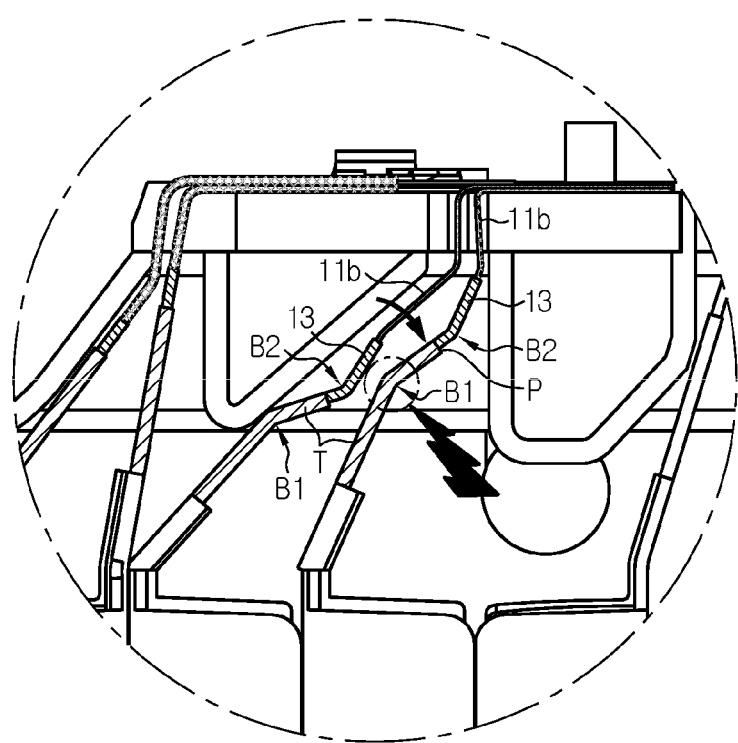
FIG. 9 is a view for describing a mechanism in which interference between adjacent battery cells is prevented when a battery cell located at the left moves with respect to a partial region of the battery module of FIG. 6.
Figure 10:
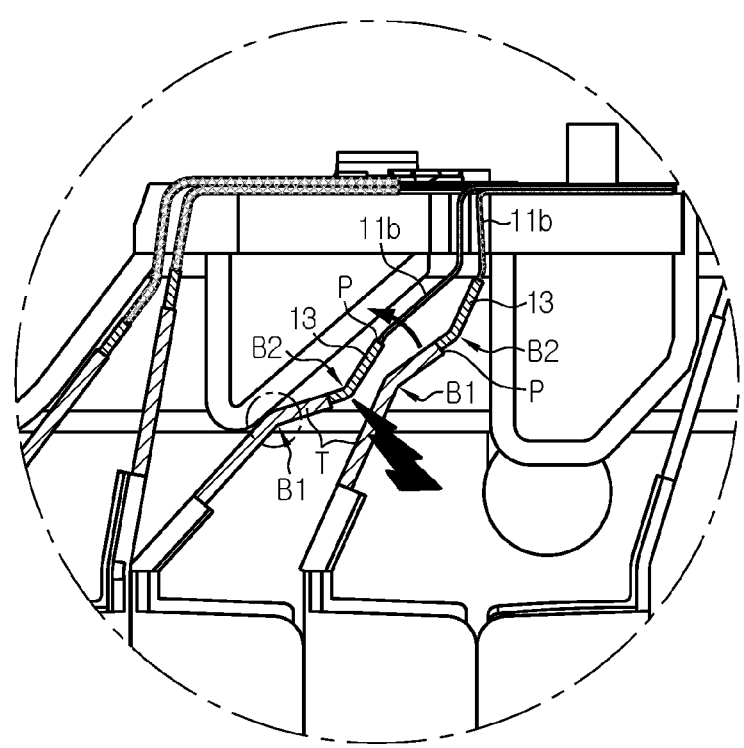
FIG. 10 is a view for describing a mechanism in which interference between adjacent battery cells is prevented when a battery cell located at the right moves with respect to the partial region of the battery module of FIG. 6.

FIG. 9 is a view for describing a mechanism in which interference between adjacent battery cells is prevented when a battery cell located at the left moves with respect to a partial region of the battery module of FIG. 6. Also, FIG. 10 is a view for describing a mechanism in which interference between adjacent battery cells is prevented when a battery cell located at the right moves with respect to the partial region of the battery module of FIG. 6.

First, referring to FIG. 9, a case in which interference occurs when the negative electrode lead 11b of the first battery cell 10a moves towards the negative electrode lead 11b of the second battery cell 10b along a direction indicated by an arrow is shown.

When the negative electrode lead 11b of the first battery cell 10a moves towards the negative electrode lead 11b of the second battery cell 10b, a portion where a contact occurs first is the lead film 13 exposed to the outside of the terrace portion T of the first battery cell 10a and the first bent portion B1 of the second battery cell 10b.

When the negative electrode lead 11b of the first battery cell 10a moves in a direction towards the second battery cell 10b, the lead film 13 exposed to the outside of the terrace portion T of the first battery cell 10a first contacts the first bent portion B1 of the second battery cell 10b due to the shape of the first bent portion B1 of the second battery cell 10b.

Also, due to the first interference between the lead film 13 of the first battery cell 10a and the first bent portion B1 of the second battery cell 10b, the negative electrode lead 11b of the first battery cell 10a no longer moves towards the second battery cell 10b. Accordingly, a phenomenon in which the negative electrode lead 11b of the first battery cell 10a contacts the boundary portion P between the lead film 13 and the terrace portion T of the second battery cell 10b is prevented.

As such, when the phenomenon in which the negative electrode lead 11b of the first battery cell 10a contacts the boundary portion P between the lead film 13 and the terrace portion T of the second battery cell 10b is prevented, an anode connection phenomenon occurred when an aluminum metal layer of a pouch film exposed to the outside through an end portion of the terrace portion T contacts the negative electrode lead 11b may be previously blocked.

Next, referring to FIG. 10, a case in which interference occurs when the negative electrode lead 11b of the second battery cell 10b moves towards the negative electrode lead 11b of the first battery cell 10a along a direction indicated by an arrow is shown.

When the negative electrode lead 11b of the second battery cell 10b moves towards the negative electrode lead 11b of the first battery cell 10a, a portion where a contact occurs first is the second bent portion B2 of the first battery cell 10a and the terrace portion T of the second battery cell 10b.

When the negative electrode lead 11b of the second battery cell 10b moves in a direction towards the first battery cell 10a, the terrace portion T of the second battery cell 10b first contacts the second bent portion B2 of the first battery cell 10a due to the shape of the second bent portion B2 of the first battery cell 10a.

Also, due to the first interference between the second bent portion B2 of the first battery cell 10a and the terrace portion T of the second battery cell 10b, the boundary portion P between the lead film 13 and the terrace portion T of the second battery cell 10b no longer moves towards the first battery cell 10a. Accordingly, a phenomenon in which the negative electrode lead 11b of the first battery cell 10a contacts the boundary portion P between the lead film 13 and the terrace portion T of the second battery cell 10b is prevented.

As such, when the phenomenon in which the negative electrode lead 11b of the first battery cell 10a contacts the boundary portion P between the lead film 13 and the terrace portion T of the second battery cell 10b is prevented, an anode connection phenomenon occurred when an aluminum metal layer of a pouch film exposed to the outside through an end portion of the terrace portion T contacts the negative electrode lead 11b may be previously blocked.

In particular, when a lithium-aluminum alloy is formed because an aluminum layer exposed at an end portion of a pouch case is oxidized due to anode connection, the lithium-aluminum alloy continuously grows via a contact with an electrolyte solution inside a battery cell, and thus a sealing performance of the pouch case is weakened. Accordingly, when moisture present in the external air of the battery cell penetrates into the battery cell, the penetrated moisture and the electrolyte solution react with each other, thereby generating a material such as hydrofluoric acid (HF). The hydrofluoric acid deteriorates a solid electrolyte interphase (SEI) film that is the important part of the battery cell, thereby deteriorating the performance of the battery cell, and also causes generation of a carbon dioxide ($C_{O2}$) gas, thereby adversely affecting battery cell swelling. Also, because a hydrogen ($H_2$) gas is generated according to electrolysis of the penetrated moisture, the battery cell swelling further deteriorates. According to the present disclosure, because anode connection is prevented, the sealing performance of the pouch case 12 is maintained, and as a result, penetration of the moisture present in the external air of the battery cell is fundamentally blocked. Accordingly, satisfactory results are exhibited in terms of damage prevention of the battery cell 10, such as SEI film maintenance, cell swelling prevention, and the like.

Meanwhile, as described above, the bending angle θ between the first bent portion B1 and the second bent portion B2 is about 30° to about 50°. Such a bending angle θ is in an optimum range for effectively preventing the negative electrode lead 11b included in the first battery cell 10a located relatively at the left among the neighboring first and second battery cells 10a and 10b from contacting the boundary portion P between the lead film 13 and the terrace portion T of the second battery cell 10b located relatively at the right, while preventing deterioration of sealability of the first and second battery cells 10a and 10b.

In other words, when the bending angle θ is formed less than about 30°, a distance between the boundary portion P between the lead film 13 and the terrace portion T of the second battery cell 10b and the negative electrode lead 11b of the first battery cell 10a may not be sufficiently obtained. Accordingly, the negative electrode lead 11b of the first battery cell 10a may contact the boundary portion P between the lead film 13 and the terrace portion T of the second battery cell 10b before occurrence of first interference by the first bent portion B1 or the second bent portion B2.

Also, when the bending angle θ exceeds about 50°, sealability and insulation of the first and second battery cells 10a and 10b may deteriorate. In other words, when the bending angle θ exceeds about 50°, the terrace portion T and the lead film 13 bend excessively, resulting in delamination of a metal layer and a resin layer inside the pouch case 12, thereby generating a partial gap in the sealing portion 12b of the pouch case 12, and thus the sealability may deteriorate and the insulation between the metal layers of the pouch case 12 may also deteriorate. As described above, in the battery module 5 according to the present disclosure, due to the bent shapes of the negative electrode leads 11b included in the pair of adjacent first and second battery cells 10a and 10b, a phenomenon in which the negative electrode lead 11b of one battery cell contacts the boundary portion P between the lead film 13 and the terrace portion T of a neighboring battery cell may be prevented, and thus damage to the battery cell may be prevented.

Also, the present disclosure does not exclude the application of a bent shape described above to the positive electrode lead 11a. In most cases, a material of a positive electrode lead is aluminum and a material of a negative electrode lead is copper, and thus when an aluminum layer is used as a metal layer of a pouch case, oxidation of the aluminum layer is problematic when the negative lead and the aluminum layer exposed at an end portion of the pouch case contact each other. However, the positive electrode lead may be manufactured of an aluminum material. Alternatively, when an electrode lead of another material is used, the aluminum layer may be oxidized when not only the negative electrode lead but also the positive electrode lead contacts the aluminum layer exposed at the end portion of the pouch case. Thus, by applying a bent structure described above to the positive electrode lead 11a, the phenomenon in which the positive electrode lead 11a of one battery cell contacts the boundary portion P between the lead film 13 and the terrace portion T of the neighboring battery cell may be prevented, thereby preventing the damage to the battery cell.

As such, according to the present disclosure, by forming a bent portion in at least one electrode lead among a negative electrode lead and a positive electrode lead, damage to a battery cell caused by interference between a pair of neighboring battery cells commonly combined to one of a plurality of bus bars included in a bus bar frame assembly may be prevented without having to apply an additional component, such as an insulating tape. Because an additional component is not applied, manufacturing of a battery module and battery pack is simplified and a defect rate is reduced. As a result, a yield rate is increased and thus manufacturing costs of the battery module and battery pack may be reduced. Because existing battery module manufacturing processes are used as they are except for forming a bent portion, the performance of the battery module may be secured relatively without having to change processes. Because a battery cell itself uses existing manufacturing processes as they are, there is no need to change processes or adjust mass production processes.

Meanwhile, as described above, the bending angle θ of an electrode lead, such as a negative electrode lead or a positive electrode lead, may be formed within a certain range, and as a first bent portion of the electrode lead is formed at a terrace portion, causing bending of a sealed portion, occurrence of an adverse effect, such as sealability deterioration or the like, in a battery cell should be avoided. An appropriate range of a bending angle and occurrence of a side effect were confirmed via experiments. Insulation voltage, insulation resistance, and high voltage (HV) insulation experiments were performed on various battery cells with a bending angle range of 20° to 60° for a negative electrode lead, and adhesive and overcharge venting patterns were compared with a comparative example where a negative electrode lead was not bent.

First, samples with bending angles of 20°, 30°, 40°, 50°, and 60° were prepared to perform the insulation voltage, insulation resistance, and HV insulation experiments.

An insulation voltage is a voltage measured between an aluminum metal layer of a pouch film exposed externally through an end portion of a terrace portion of a negative electrode lead of a battery cell, and a positive electrode lead of the battery cell. Occurrence of anode connection is determined by measuring the insulation voltage. A reference voltage determining pass/fail, for example, several V, was determined, and upon determining pass when the measured insulation voltage is equal to or lower than the reference voltage and fail when the measured insulation voltage is higher than the reference voltage, fail occurred in the sample with the bending angle of 60°. Accordingly, it was determined that the bending angle corresponding to 60° is an excessive bending angle.

Insulation resistance is resistance measured between an aluminum metal layer of a pouch film exposed externally through an end portion of a terrace portion of a negative electrode lead of a battery cell, and a positive electrode lead of the battery cell. An insulation performance of the battery cell is determined when such insulation resistance is measured. Reference resistance determining pass/fail, for example, several MΩ, was determined, and upon determining pass when the measured insulation resistance is equal to or greater than the reference resistance and fail when the measured insulation resistance is smaller than the reference resistance, fail occurred in the sample with the bending angle of 60°. Accordingly, it was determined that the bending angle corresponding to 60° is an excessive bending angle.

It was determined that a preferable range of a bending angle was 30° to 50° considering results of the above experiments and other factors described above.

The HV insulation experiment is performed by measuring resistance while applying a high voltage between an electrode lead and a surface of a pouch case. An insulation performance of the surface of the pouch case and a sealing portion of the electrode lead may be checked via such an HV insulation experiment. Reference resistance determining pass/fail while applying a high voltage of tens of V, for example, hundreds of MΩ, was determined, and upon determining pass when the measured insulation resistance is equal to or greater than the reference resistance and fail when the measured insulation resistance is smaller than the reference resistance, all samples were determined to be pass. When the bending angle θ was in a range of 20° to 60°, it was confirmed that there is no abnormality in the insulation performance of the surface of the pouch case and the sealing portion of the electrode lead. Accordingly, it was verified that the bending of the negative electrode lead as in the present disclosure does not affect the insulation performance of the surface of the pouch case and the sealing portion of the electrode lead.

Adhesive forces of the samples with the bending angles of 20°, 30°, 40°, 50°, and 60° and the comparative example were compared. The adhesive force was evaluated by measuring a force when the negative electrode lead is pulled and separated from the battery cell. The adhesive forces at levels similar to the comparative example were confirmed for all samples. Thus, it was verified that the bending of the negative electrode lead as in the present disclosure does not affect the adhesive force of the negative electrode lead.

Overcharge venting patterns of the sample with the bending angle of 40° and the comparative example were compared. Upon observing time until venting, venting pressure, and a shape change of the sealing portion of the negative electrode lead while charging the battery cells at a constant current of a predetermined current at 100% state of charge (SoC), the sample with the bending angle of 40° had a level similar to the comparative example. Thus, it was verified that the bending of the negative electrode lead does not weaken an overcharge venting performance.

Through results of such experiments, it was determined that bending of an electrode lead as proposed in the present disclosure does not affect insulation performances of a surface of a pouch case and a sealing portion of the electrode lead, does not affect an adhesive force of the electrode lead, and does not weaken an overcharge venting performance.

Figure 11:
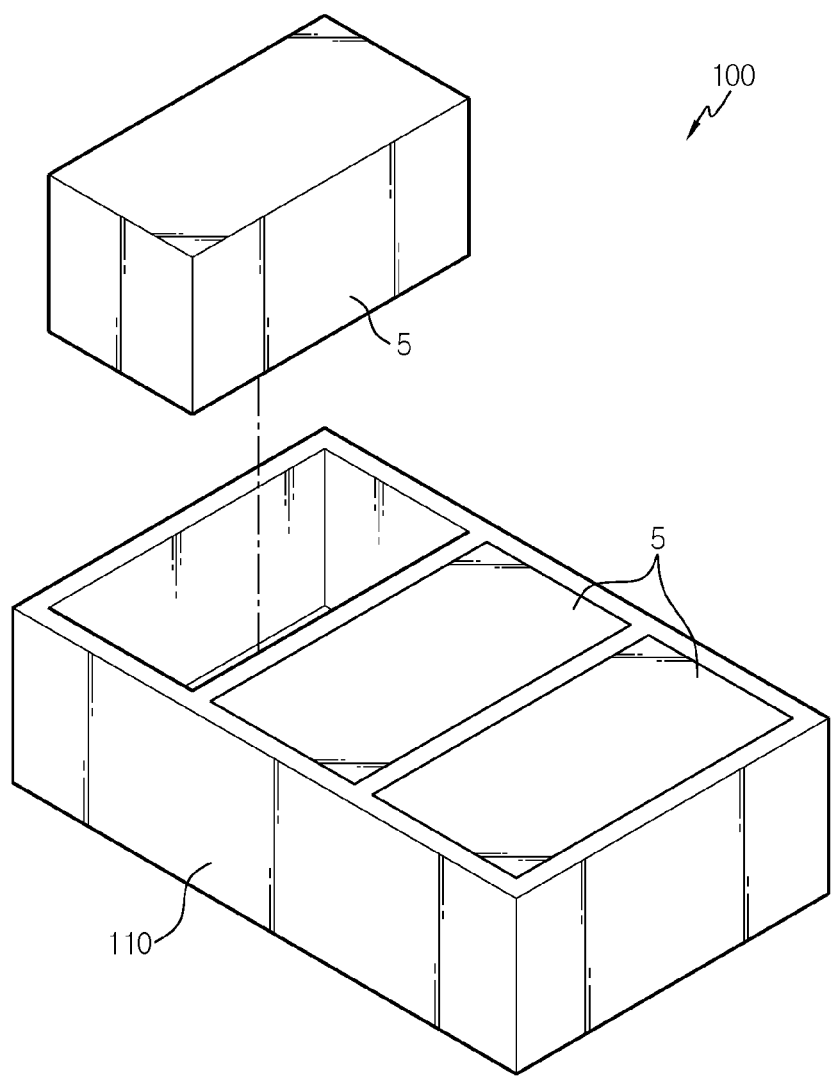
FIG. 11 is a schematic view of a battery pack according to the present disclosure.

Meanwhile, a battery pack according to an embodiment of the present disclosure is implemented in a form of including a plurality of battery modules according to an embodiment of the present disclosure described above. FIG. 11 is a schematic view of a battery pack according to the present disclosure.

Referring to FIG. 11, a battery pack 100 may include at least the plurality of battery modules 5 according to the previous embodiment, and a pack case 110 packaging the plurality of battery modules 5. Also, the battery pack 100 according to the present disclosure may further include, in addition to the battery module 5 and the pack case 110, various devices for controlling charging and discharging of the battery module 5, such as a battery management system (BMS), a current sensor, a fuse, and the like. Since the battery pack 100 according to the current embodiment includes the battery module 5 of the previous embodiment, the battery pack 100 includes all advantages of the battery module 5 of the previous embodiment.

The battery module 5 or battery pack 100 according to the present disclosure may be used while maintaining an excellent performance for a long time because battery cell performance deterioration is prevented, and in particular, is suitable to be used as a power source of a medium or large device that requires a long cycle characteristic and a high rate characteristic. Examples of the medium or large device include a power tool moving upon receiving driving power by an electric motor; an electric car such as an electric vehicle (EV), a hybrid electric vehicle (HEV), or plug-in hybrid electric vehicle (PHEV); an electric two-wheeled vehicle, such as an E-bike or an E-scooter; an electric golf cart; and an energy storage system (ESS), but are not limited thereto.

Figure 12:
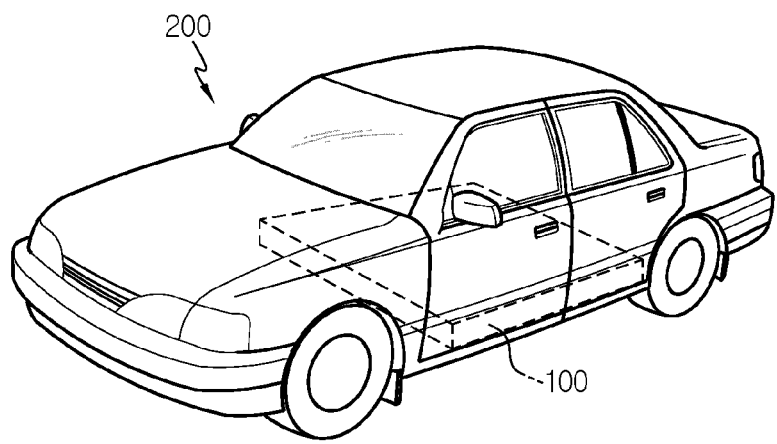
FIG. 12 is a schematic view of a vehicle according to the present disclosure.

Also, a vehicle according to an embodiment of the present disclosure is implemented in a form of including a battery pack according to an embodiment of the present disclosure described above. FIG. 12 is a schematic view of a vehicle according to the present disclosure.

Referring to FIG. 12, a vehicle 200 may include the battery pack 100 of the previous embodiment. Such a vehicle 200 may be an EV, an HEV, or another vehicle including the battery pack 100 as a fuel source.

Since the vehicle 200 according to the current embodiment includes the battery pack 100 of the previous embodiment, the vehicle 200 includes all advantages of the battery pack 100 of the previous embodiment. The battery pack 100 may be included in, in addition to the vehicle 200, a power storage device or another device or equipment using the battery pack 100 as an energy source.

Preferably, the vehicle 200 may be an EV. The battery pack 100 may be used as an electric energy source driving the vehicle 200 by providing driving power to a motor of the EV. In this case, the battery pack 100 may be manufactured to have a high nominal voltage equal to or greater than 100 V. In case of an HEV, a nominal voltage of the battery pack 100 may be adjusted to 270 V.

The battery pack 100 may be charged or discharged by an inverter according to driving of a motor and/or internal combustion engine. The battery pack 100 may be charged by a regenerative charging device combined to a break. The battery pack 100 may be electrically connected to a motor of the vehicle 200 via the inverter.

Such a vehicle 200 includes the battery pack 100 according to the present disclosure, and the battery pack 100 includes the battery module 5 in which battery cell damage is prevented as described above. Accordingly, a performance of the battery pack 100 is maintained for a long time and such a battery pack 100 is used for a long time, and thus the vehicle 200 including the battery pack 100 may be easily operated and maintained and used for a long time.

Hereinabove, the present disclosure has been described with reference to limited embodiments and drawings, but the present disclosure is not limited thereto, and various modifications and changes are possible by one of ordinary skill in the art within the technical concept of the present disclosure and the equivalent scope of the claims below.

What is claimed is:

1. A battery module comprising:
   a cell stack structure in which a plurality of battery cells including a first battery cell and a second battery cell neighboring each other are stacked, each of the battery cells including a pouch case, an electrode lead, a lead film on the electrode lead and a terrace portion formed by a sealing portion of the pouch case; and
   a bus bar frame assembly combined to at least one side of the cell stack structure and comprising a plurality of lead drawing holes from which the electrode leads are drawn out,
   wherein a first electrode lead of a first polarity included in the first battery cell and a second electrode lead of the first polarity included in the second battery cell are externally drawn out through a same lead drawing hole,
   wherein the first electrode lead and the second electrode lead are bent in a same direction and each electrode lead comprises a first bent portion formed on the terrace portion and a second bent portion formed outwardly of the terrace portion in a region where the lead film is formed,
   wherein each electrode lead has a first section between a proximal end of the electrode lead and the first bent portion, a second section between the first bent portion and second bent portion and a third section after the second bent portion, wherein the second section is straight, wherein a first bending direction in the first bent portion and a second bending direction in the second bent portion are opposite directions, wherein the first bending direction of the first battery cell is a direction approaching the second battery cell and the second bending direction of the first battery cell is a direction receding from the second battery cell, wherein the first bending direction of the second battery cell is a direction receding from the first battery cell and the second bending direction of the second battery cell is a direction approaching the first battery cell, wherein the second bent portion of the first battery cell is formed at a location corresponding to the terrace portion of the second battery cell, and wherein the first bent portion of the second battery cell is formed at a location corresponding to the region where the lead film of the first battery cell is formed.

2. The battery module of claim 1, wherein the second bent portion of the first battery cell is located below the first bent portion of the second battery cell.

3. The battery module of claim 1, wherein bending angles of the first bent portion and the second bent portion are 30° to 50°.

4. The battery module of claim 1, wherein bending angles of the first bent portion and the second bent portion are the same.

5. The battery module of claim 1, wherein the first battery cell and the second battery cell each further comprise an electrode lead of a second polarity, and wherein the first polarity is a negative polarity and the second polarity is a positive polarity.

6. The battery module of claim 1, wherein the first battery cell and the second battery cell each further comprise an electrode lead of a second polarity, and wherein the first polarity is a positive polarity and the second polarity is a negative polarity.

7. The battery module of claim 1, wherein each battery cell has a first end and a second end and an axis extending from the first end to the second end, and wherein the first section is parallel to the axis and the third section is at an angle to the axis.

8. The battery module of claim 1, wherein the first bent portion is an acute angle.

9. The battery module of claim 8, wherein the second bent portion is an acute angle.

10. The battery module of claim 8, wherein the third section includes a distal end of the electrode lead.

11. The battery module of claim 1, wherein the first section and third section are not colinear.

12. A battery pack comprising a plurality of the battery modules according to claim 1.

13. A vehicle comprising the battery pack according to claim 12.

* * * * *